United States Patent
Buur et al.

(10) Patent No.: US 8,428,816 B2
(45) Date of Patent: Apr. 23, 2013

(54) METHOD AND APPARATUS FOR MONITORING SOFTWARE AND SIGNAL INTEGRITY IN A DISTRIBUTED CONTROL MODULE SYSTEM FOR A POWERTRAIN SYSTEM

(75) Inventors: Hanne Buur, Brighton, MI (US); William R. Cawthorne, Milford, MI (US); Trenton W. Haines, Novi, MI (US); Jeong J Park, Ann Arbor, MI (US); Leonard G. Wozniak, Ann Arbor, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 914 days.

(21) Appl. No.: 12/246,654

(22) Filed: Oct. 7, 2008

(65) Prior Publication Data

US 2009/0112399 A1 Apr. 30, 2009

Related U.S. Application Data

(60) Provisional application No. 60/983,164, filed on Oct. 27, 2007.

(51) Int. Cl.
*G06F 7/00* (2006.01)
(52) U.S. Cl.
USPC .......................................... 701/36

(58) Field of Classification Search ............ 701/29, 701/33, 36, 54; 180/65, 265; 903/930; 342/357, 342/358
See application file for complete search history.

(56) References Cited

U.S. PATENT DOCUMENTS

| | | | |
|---|---|---|---|
| 5,343,782 A * | 9/1994 | Jamzadeh | 477/156 |
| 6,766,479 B2 * | 7/2004 | Edwards, Jr. | 714/43 |
| 6,832,148 B1 | 12/2004 | Bennett | |
| 6,868,318 B1 | 3/2005 | Cawthorne | |
| 7,154,236 B1 | 12/2006 | Heap | |
| 7,315,774 B2 * | 1/2008 | Morris | 701/53 |
| 2001/0016927 A1 * | 8/2001 | Poisner | 714/718 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |

(Continued)

FOREIGN PATENT DOCUMENTS
DE 102007003146 A1 8/2007

*Primary Examiner* — John Nguyen
*Assistant Examiner* — Jordan Fei

(57) ABSTRACT

A method to monitor integrity of a signal generated and communicated in a distributed control module system for a hybrid powertrain system includes generating and verifying signal within an originating control module. A message is generated based upon the signal. The message is transmitted and received at a receiving control module. The signal is extracted from the message and its integrity is verified.

16 Claims, 5 Drawing Sheets

U.S. PATENT DOCUMENTS

| | | |
|---|---|---|
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0027592 A1* | 2/2007 | Tolkacz ............... 701/29 |
| 2007/0078580 A1 | 4/2007 | Cawthorne |
| 2007/0093953 A1 | 4/2007 | Heap |
| 2007/0112483 A1 | 5/2007 | Jeong |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1* | 4/2009 | Buur et al. ............... 180/65.265 |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |

| | | | | | |
|---|---|---|---|---|---|
| 2009/0118926 A1 | 5/2009 | Heap | 2009/0118945 A1 | 5/2009 | Heap |
| 2009/0118927 A1 | 5/2009 | Heap | 2009/0118946 A1 | 5/2009 | Heap |
| 2009/0118928 A1 | 5/2009 | Heap | 2009/0118947 A1 | 5/2009 | Heap |
| 2009/0118929 A1 | 5/2009 | Heap | 2009/0118948 A1 | 5/2009 | Heap |
| 2009/0118930 A1 | 5/2009 | Heap | 2009/0118949 A1 | 5/2009 | Heap |
| 2009/0118931 A1 | 5/2009 | Kaminsky | 2009/0118950 A1 | 5/2009 | Heap |
| 2009/0118932 A1 | 5/2009 | Heap | 2009/0118951 A1 | 5/2009 | Heap |
| 2009/0118933 A1 | 5/2009 | Heap | 2009/0118952 A1 | 5/2009 | Heap |
| 2009/0118934 A1 | 5/2009 | Heap | 2009/0118954 A1 | 5/2009 | Wu |
| 2009/0118935 A1 | 5/2009 | Heap | 2009/0118957 A1 | 5/2009 | Heap |
| 2009/0118936 A1 | 5/2009 | Heap | 2009/0118962 A1 | 5/2009 | Heap |
| 2009/0118937 A1 | 5/2009 | Heap | 2009/0118963 A1 | 5/2009 | Heap |
| 2009/0118938 A1 | 5/2009 | Heap | 2009/0118964 A1 | 5/2009 | Snyder |
| 2009/0118939 A1 | 5/2009 | Heap | 2009/0118969 A1 | 5/2009 | Heap |
| 2009/0118940 A1 | 5/2009 | Heap | 2009/0118971 A1 | 5/2009 | Heap |
| 2009/0118941 A1 | 5/2009 | Heap | 2009/0118999 A1 | 5/2009 | Heap |
| 2009/0118942 A1 | 5/2009 | Hsieh | 2009/0144002 A1 | 6/2009 | Zettel |
| 2009/0118943 A1 | 5/2009 | Heap | | | |
| 2009/0118944 A1 | 5/2009 | Heap | | | |

* cited by examiner

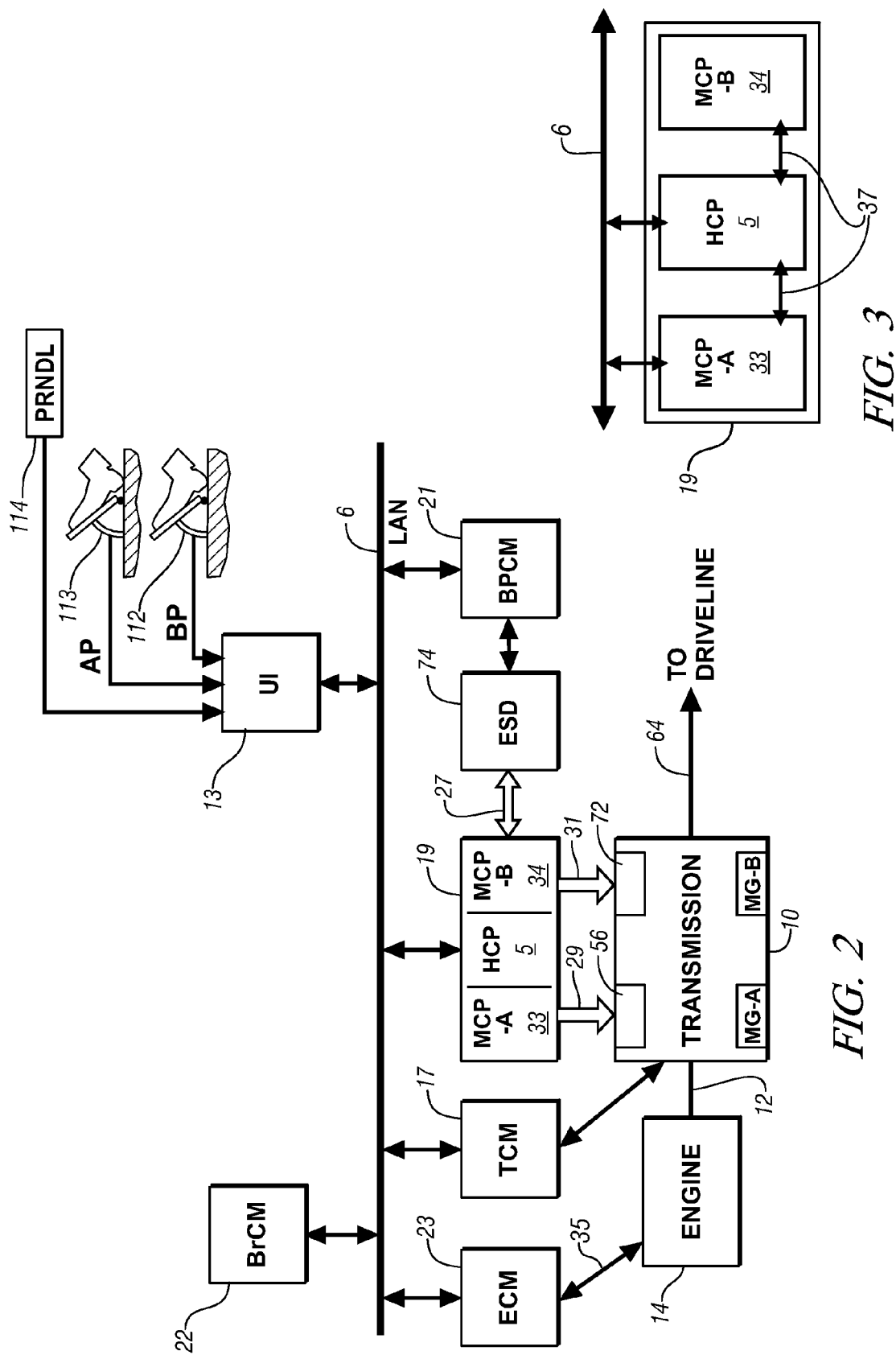

METHOD AND APPARATUS FOR MONITORING SOFTWARE AND SIGNAL INTEGRITY IN A DISTRIBUTED CONTROL MODULE SYSTEM FOR A POWERTRAIN SYSTEM

CROSS REFERENCE TO RELATED APPLICATIONS

This application claims the benefit of U.S. Provisional Application No. 60/983,164, filed on Oct. 27, 2007 which is hereby incorporated herein by reference.

TECHNICAL FIELD

This disclosure is related to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electromechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system is operative to monitor various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed. A control system can monitor input and control signals and execute algorithms to verify and secure operation of the powertrain.

SUMMARY

A method to monitor signal integrity in a distributed control module system operative to control a hybrid powertrain system includes establishing a communications link to transmit a signal between an originating control module and a receiving control module. The signal is generated in the originating control module. Integrity of the signal is verified within the originating control module, and a message based upon the signal is generated. The message is transmitted to the receiving control module using the communications link. The message is received at the receiving control module whereat the signal is decoded from the message. Integrity of the signal is verified within the receiving control module.

BRIEF DESCRIPTION OF THE DRAWINGS

One or more embodiments will now be described, by way of example, with reference to the accompanying drawings, in which:

FIGS. 2 and 3 are schematic diagrams of an exemplary architecture for a control system and hybrid powertrain, in accordance with the present disclosure.

DETAILED DESCRIPTION

Figure 1:
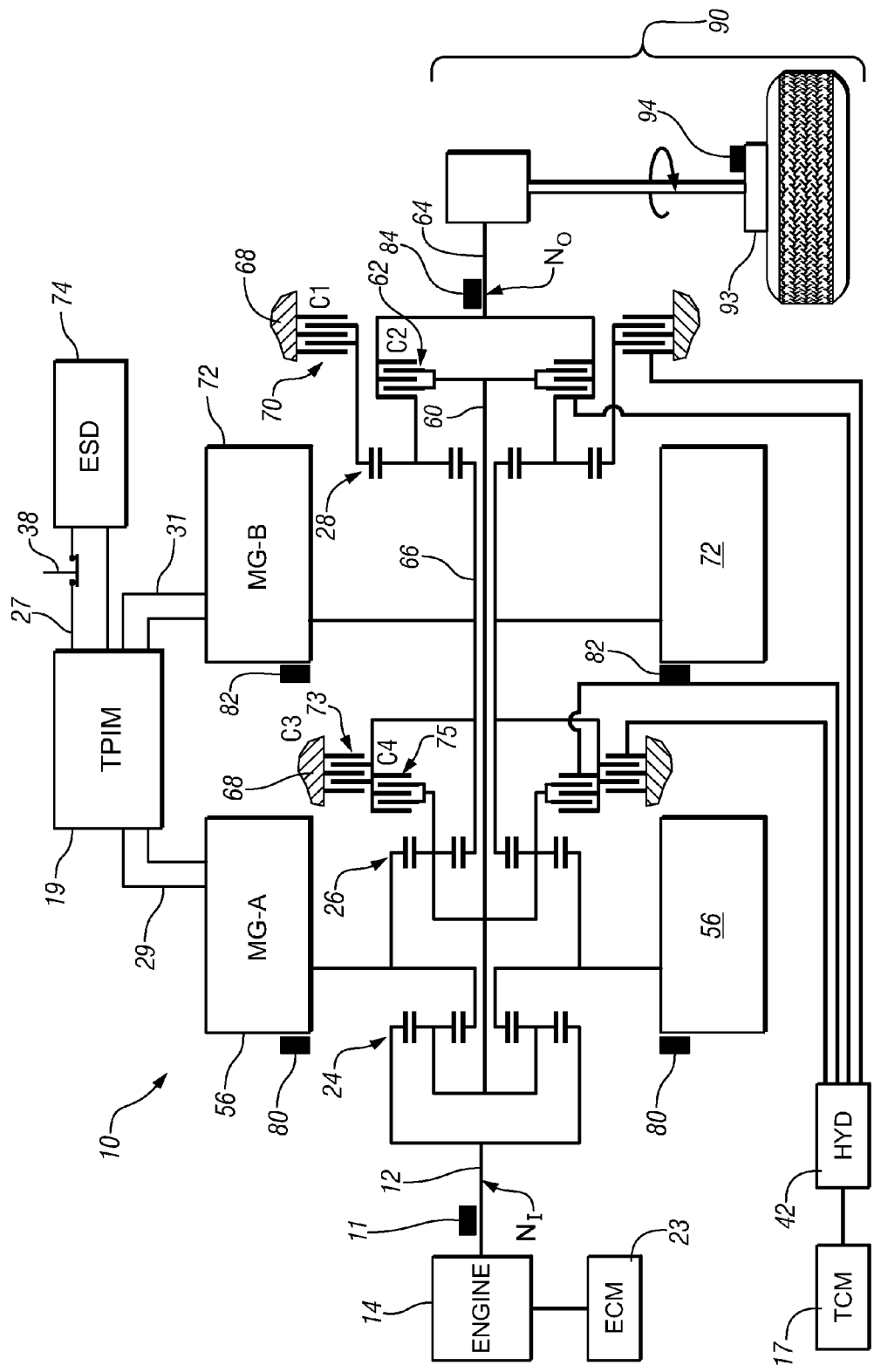
FIG. 1 is a schematic diagram of an exemplary hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electromechanical hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72. The engine 14 and first and second electric machines 56 and 72 each generate mechanical power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input member 12, and can be either a spark-ignition or a compression-ignition engine. The engine 14 includes a crankshaft (not shown) operatively coupled to the input member 12 of the transmission 10. A rotational speed sensor 11 monitors rotational speed of the input member 12. Power output from the engine 14, comprising rotational speed and engine torque, can differ from the input speed $N_I$ and the input torque $T_I$ to the transmission 10 due to placement of torque-consuming components on the input member 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit ('HYD') 42, preferably controlled by a transmission control module (hereafter 'TCM') 17, is operative to control and monitor clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque To. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 through a first motor control module ('MCP-A') 33 using transfer conductors 29, and the TPIM 19 similarly transmits electrical power to and from the second electric machine 72 through a second motor control module ('MCP-B') 34 using transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 preferably includes a hybrid control module (hereafter 'HCP') 5 and the pair of power inverters and respective motor control modules 33 and 34 configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIGS. 2 and 3 are schematic block diagrams of the distributed control module system of the control system. As used herein, the term 'control system' is defined as the control modules, wiring harnesses (not shown), communications links, sensors and actuators that monitor and control operation of the powertrain system. The control system monitors sensor inputs and commands outputs for controlling the actuators. The distributed control module system comprises a subset of overall vehicle control architecture, and provides coordinated system control of the exemplary hybrid powertrain described in FIG. 1. The control system includes the distributed control module system for synthesizing information and inputs, and executing algorithms to control actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. The HCP 5 provides supervisory control and coordination of the ECM 23, the TCM 17, the BPCM 21, and the TPIM 19. A user interface ('UI') 13 is preferably signally connected to a plurality of devices through which a vehicle operator controls, directs, and commands operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction. The user interface 13 can comprise a single device, as shown, or alternatively can comprise a plurality of user interface devices directly connected to the individual control modules (not shown).

The aforementioned control modules communicate with other control modules, sensors, and actuators via a communications link comprising a local area network (hereafter 'LAN') bus 6, in this embodiment. The LAN bus 6 allows for structured communication between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communications between the MCP-A 33 and the HCP 5 and between the MCP-B 34 and the HCP 5 is preferably effected using direct links preferably comprising serial peripheral interface (hereafter 'SPI') buses 37. Communication between individual control modules can also be effected using a wireless link, e.g., a short range wireless radio communications bus (not shown).

The HCP 5 provides supervisory control of the hybrid powertrain, serving to coordinate operation of the ECM 23, TCM 17, MCP-A 33, MCP-B 34, and BPCM 21. Based upon various command signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The HCP 5 sends commands to specific control modules to effect control of the engine 14, transmission 10 and the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input member 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates control signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates actuator control signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

FIG. 3 shows details of the TPIM 19. The MCP-A 33 and the HCP 5 are preferably signally connected to the LAN 6. MCP-A 33 and MCP-B 34 are directly signally connected to the HCP 5 using first and second SPI buses 37 which are preferably dedicated, i.e., communicate exclusively between the HCP 5 and the MCP-A 33 and the HCP 5 and the MCP-B 34, respectively.

Each of the control modules ECM 23, TCM 17, HCP 5, MCP-A 33, MCP-B 34, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses 37. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input member 12. When the transmission 10 is controlled in EVT Mode 1, the transmission 10 can be commanded to operate in the reverse direction, which is accomplished by operating the second electric machine 72 in the reverse rotational direction through its motor control module in TPIM 19. A neutral operating range state can be effected by deactivating all of the torque transfer clutches.

In response to operator input via the accelerator pedal 113 and brake pedal 112 as captured by the user interface 13, the HCP 5 and one or more of the other control modules determine torque commands to control the torque actuators to meet the operator torque request at the output member 64 for transference to the driveline 90. The torque actuators preferably include a plurality of torque generative devices, e.g., the engine 14 and the first and second electric machines 56 and 72 and a torque transferring device comprising the transmission 10 in this embodiment. Based upon operator commands from the user interface 13, the HCP 5 determines the operator torque request and an output torque command from the transmission 10 to the driveline 90 and actuator controls including an input torque from the engine 14, clutch torques for the torque-transfer clutches C1 70, C2 62, C3 73, C4 75 of the transmission 10 and the motor torques for the first and second electric machines 56 and 72 based upon operator commands from the user interface 13.

Figure 4:
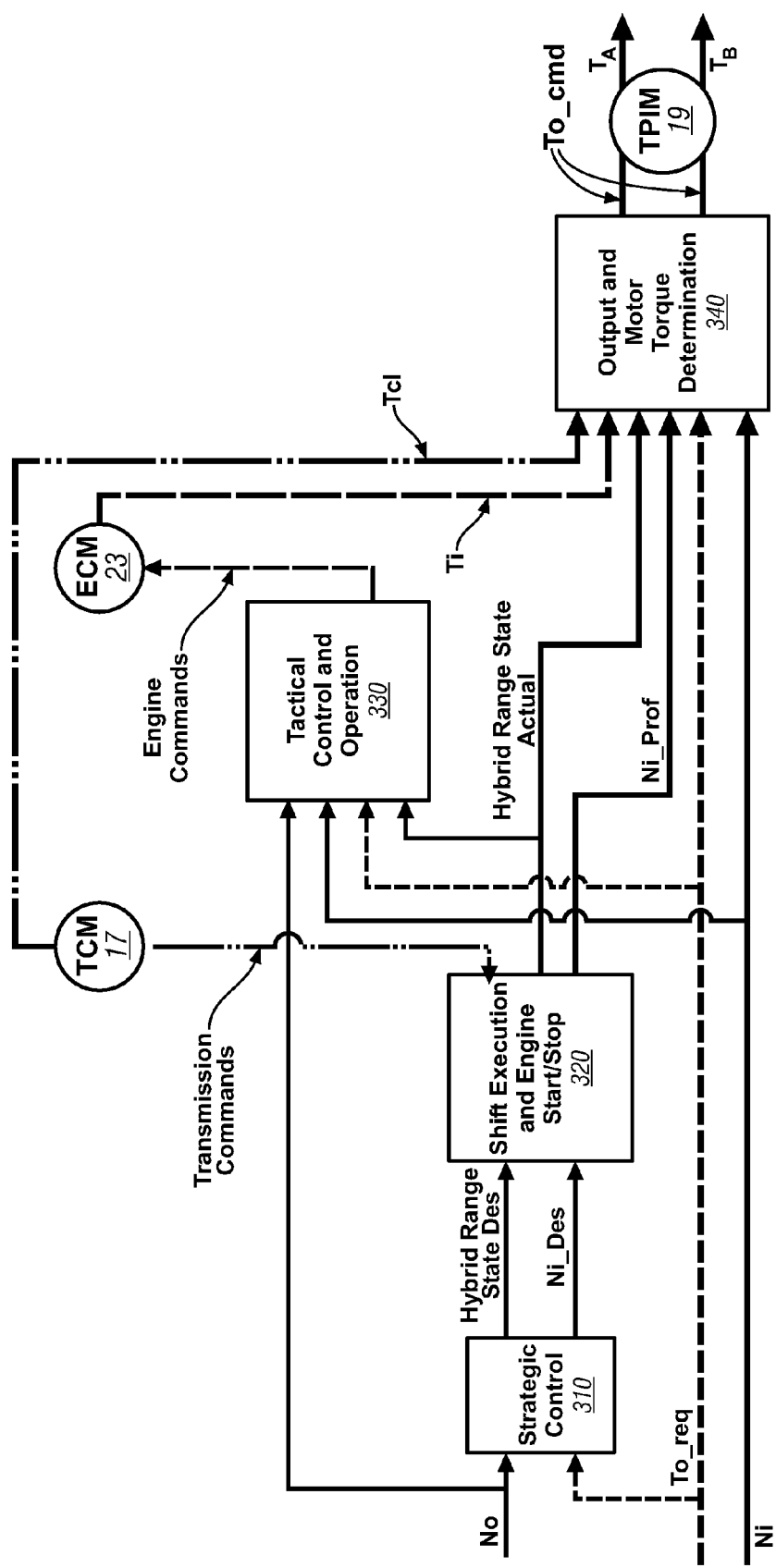
FIGS. 4, 5, and 6 are schematic flow diagrams of a control scheme, in accordance with the present disclosure.

FIG. 4 shows an embodiment of an architecture to control and manage signal flow in a powertrain system including torque actuators comprising multiple torque generating devices and a torque transferring device to control and manage torque transfer and power flow. The architecture is described with reference to, but not limited by, the powertrain system described hereinabove. The flow of signals through the control modules controls the torque generating devices and the torque transferring device. In operation, the operator inputs to the accelerator pedal 113 and the brake pedal 112 are monitored to determine the operator command comprising the operator torque request ('To_req'). Operation of the engine 14 and the transmission 10 are monitored to determine the input speed ('Ni') and the output speed ('No'). A strategic optimization control scheme ('Strategic Control') 310 determines a preferred input speed ('Ni_Des') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to operate the transmission 10 ('Transmission Commands') including commanding a change to the preferred operating range state. This includes commanding and executing a change in the operating range state if the preferred operating range state is different from the present operating range state by commanding changes in application of one or more of the clutches C1 70, C2 62, C3 73, and C4 75, and other commands. The present operating range state ('Hybrid Range State Actual') and an input speed profile ('Ni_Prof') can be determined. The input speed profile is an estimate of an upcoming time-rate change in the input speed and preferably comprises a scalar parametric value that is a targeted input speed for the forthcoming loop cycle, based upon the engine operating commands and the operator torque request during a transition in the operating range state of the transmission, i.e., executing a transmission shift from a first to a second operating range state.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the sensor inputs comprising output speed, the input speed, and the operator torque request and the present operating range state for the transmission. A clutch torque ('Tcl') for each clutch is estimated in the TCM 17, including the presently applied clutches and the non-applied clutches, and a present engine input torque ('Ti') reacting with the input member 12 is determined in the ECM 23. A motor torque control scheme ('Output and Motor Torque Determination') 340 is executed to determine the preferred output torque from the powertrain ('To_cmd'), which includes motor torque commands ('$T_A$', '$T_B$') for controlling the first and second electric machines 56 and 72 in this embodiment. The preferred output torque is based upon the estimated clutch torque (s) for each of the clutches, the present input torque from the engine 14, the present operating range state, the input speed, the operator torque request, and the input speed profile. The first and second electric machines 56 and 72 are controlled through the MCP-A 33 and MCP-B 34 to meet the preferred motor torque commands based upon the preferred output torque.

Securing and monitoring signal integrity to effect torque security is described hereinbelow with reference to the hybrid powertrain system shown in FIGS. 1, 2, 3, and 4, and resides in the aforementioned distributed control modules in the form of executable algorithms and calibrations. The architecture can be applied to powertrain systems having multiple torque generating devices, including, e.g., an electromechanical powertrain system having an engine and a single electric machine, a hybrid powertrain system having multiple electric machines, and hydraulic-mechanical hybrid powertrain systems. Controlling and managing the torque and power flow includes monitoring control system hardware, algorithms, and signal integrity.

Torque security of the hybrid powertrain system can be achieved by executing integrity tests of the control system which include monitoring hardware integrity of the control system, including the wiring harnesses (not shown), communications links, sensors and actuators that monitor and control operation of the powertrain system. Torque security can be achieved by monitoring integrity of algorithms and memory devices, securing and monitoring signal integrity during communications within a control module and communications between the control modules, monitoring integrity of the individual control modules and processors, and executing remedial actions. Torque security in the presence of an observed fault can include limiting an actuator command signal. This can include maximum and minimum limits on actuator command signals, and maximum rates of change on actuator command signals. Specifically, motor torque commands $T_A$ and $T_B$ can be limited to maximum and minimum motor torques, and changes in the motor torque commands $T_A$ and $T_B$ can be limited to effect a maximum rate of change in output torque, e.g., 0.2 g.

Securing and monitoring signal integrity is preferably accomplished by individually securing the control modules and securing the serial communications links between the control modules. The distributed control module system of the embodiment preferably includes each of the torque actuators controlled by a separate control module. This embodiment includes the ECM 23 that monitors sensors and control actuators of the engine 14, the TCM 17 that monitors sensors and control actuators of the transmission 10, the MCP-A 33 that monitors sensors and control actuators of the first electric machine 56, and the MCP-B 34 that monitors sensors and control actuators of the second electric machine 72. The HCP 5 monitors inputs from and commands operation of the ECM 23, TCM 17, MCP-A 33 and MCP-B 34. The control modules communicate the signals using the LAN bus 6 and the SPI bus 37. Each of the ECM 23, MCP-A 33, MCP-B 34 and TCM 17, is responsible for closed loop monitoring and self-security based on secured commands received from the HCP 5.

Securing and monitoring integrity of the signal includes monitoring processor integrity for each of the control modules. The processor integrity can be determined using diagnostics software that monitors data internal to the control module, and rationalizing it in one of the loop cycles. When an inconsistency between monitored data and rationalized data is detected, the inconsistency is recorded as a mismatch or a fault in a fault maturation algorithm, e.g., an X of Y routine wherein a matured fault is detected when X faults are observed out of immediately preceding Y observations of the signal. An example is detecting a matured fault when more than half the immediately preceding observations are mismatches occurring between the monitored data and the rationalized data. When the fault maturation algorithm achieves a threshold number of mismatching observations in the immediately preceding observations, the fault has matured, indicating signal corruption and a requirement for remedial action. The remedial action can be actuator-specific or across the entire control system, and places the powertrain in a torque-safe state. The remedial action will also include storing an OBD compliant code for subsequent retrieval. A diagnostic may preliminarily identify a fault pending, meaning an inconsistency has been detected but the fault maturation algorithm has not reached its threshold. The hardware integrity can be further determined using diagnostics software that monitors the sensors and actuators of the control system.

Monitoring integrity of a signal that is generated and communicated in the control system comprises actions to determine whether a received signal matches the generated signal. A signal can include an operator command signal, a sensor input signal and an actuator command and control signal. With reference to the embodiment described hereinabove, a signal can comprise an actuator command or control signal, including, e.g., motor torque commands for the first and second electric machines 56 and 72, the input torque command to the engine 14, and clutch torque commands for the clutches C1 70, C2 62, C3 73, and C4 75 of the transmission 10. The signal can include the sensor input signal, e.g., a signal from the rotational speed sensor 11 and the transmission output speed sensor 84 and resolvers 80 and 82. The signal can include an operator command, e.g., an operator input to the accelerator pedal 113, the operator brake pedal 112 and the transmission gear selector 114.

When a signal is generated in an originating control module, the signal is verified within the originating control module prior to transmitting it. The signal is transmitted via one of the communications links to a receiving control module. The transmitted signal is verified in the receiving control module prior to using it for command or other operation in the receiving control module. The signal can include operator command signals including the operator inputs to the accelerator pedal 113, the operator brake pedal 112, the transmission gear selector 114 and the vehicle speed cruise control. The signal can include sensor input signals comprising states of operating parameters determined from sensor inputs. The signal can include actuator command and control signals.

Securing and monitoring integrity of the signal includes verifying first and second memory locations in a memory device of the originating control module, and verifying the signal by redundantly storing the signal at the first and second memory locations in a memory device. The redundantly stored signals at the first and second memory locations can be compared immediately prior to transmitting the redundantly stored signals. Securing and monitoring integrity of the signal includes transmitting the redundantly stored signals via the communications link to the receiving control module, which receives and stores the transmitted redundantly stored signals in first and second memory locations. The transmitted signal is verified in the receiving control module by comparing the transmitted redundantly stored signals stored in first and second memory locations within the receiving control module. Corruption of the signal within either the originating control module or the receiving control module can be determined when a difference between the redundantly stored signals is greater than a threshold, leading the control module to execute remedial action.

Monitoring integrity of a signal that is generated and communicated in the control system comprises actions to determine whether a received signal matches the original signal. A signal can include an operator command signal, a sensor input signal and an actuator command and control signal. With reference to the embodiment described hereinabove, a signal can comprise an actuator command or control signal, including, e.g., motor torque commands for the first and second electric machines 56 and 72, the input torque command to the engine 14, and clutch torque commands for the clutches C1 70, C2 62, C3 73, and C4 75 of the transmission 10. The signal can include the sensor input signal, e.g., a signal from the rotational speed sensor 11 and the transmission output speed sensor 84 and resolvers 80 and 82. The signal can include an operator command, e.g., an operator input to the accelerator pedal 113, the operator brake pedal 112 and the transmission gear selector 114.

Securing and verifying integrity of a signal that is communicated from an originating control module to a receiving control module is preferably effected by using redundant data comprising primary and secondary signals, rationalizing the primary signal, executing a dual store function prior to storing the signal, creating and transmitting a message including the signal from an originating control module to a receiving control module using the communications bus, e.g., LAN bus 6, or SPI bus 37, and receiving and decoding the received message to primary and secondary signals. The primary and secondary signals can be compared prior to processing or execution at one of the actuators.

Figure 5:
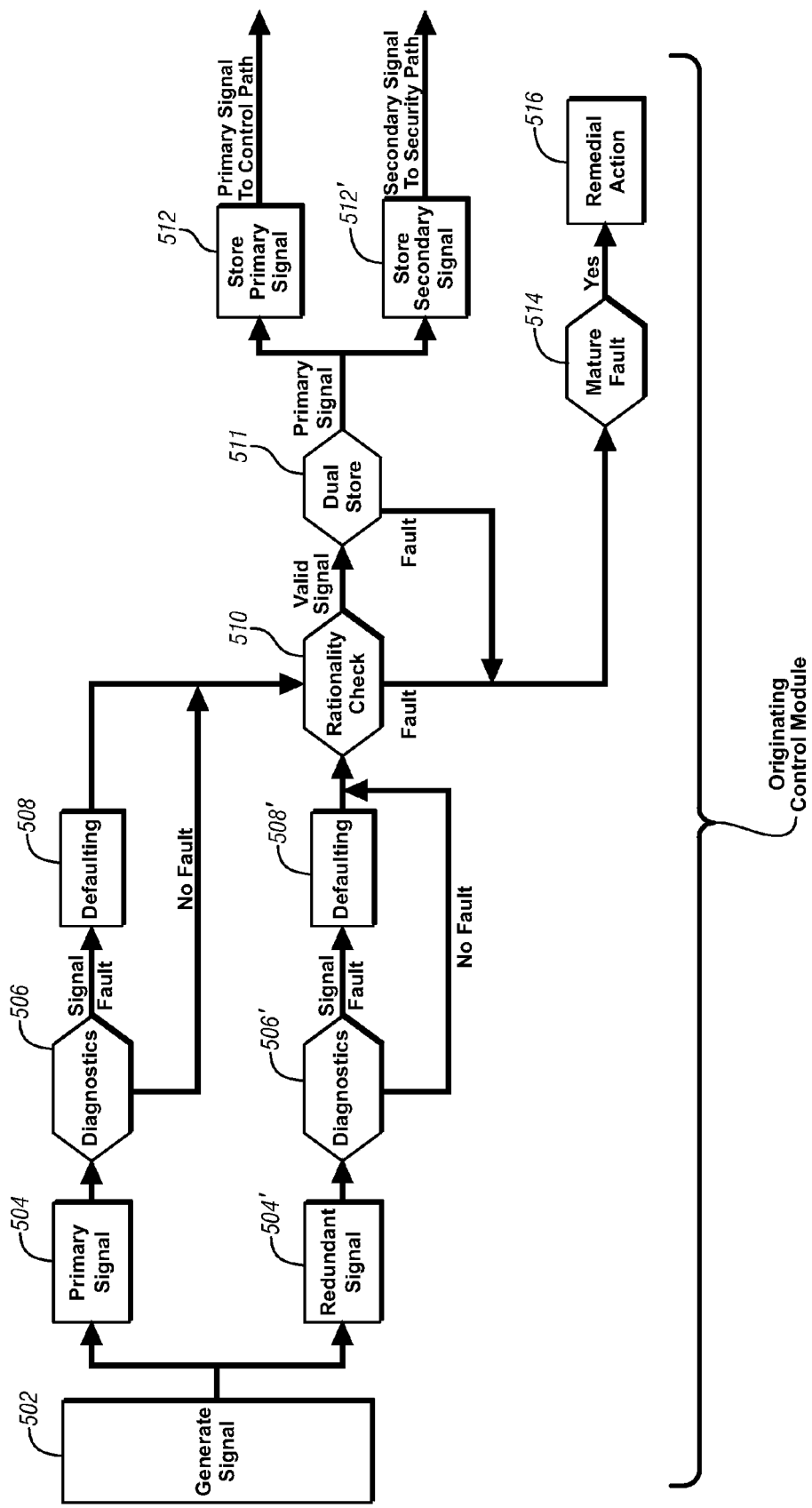

FIG. 5 shows signal flow to secure and verify integrity of an input signal to an originating control module, which comprises an input signal generated by a sensor signally connected to the originating control module in this depiction. Alternatively, the input signal in the originating control module can comprise one of an operator command signal and an actuator command and control signal. The input signal is generated (502) and is captured as a primary signal 504 and a redundant signal 504'. This can include the input signal from the sensor converted to a digital representation of the input from the sensor using an analog-to-digital converter (not shown) which may be interposed between the sensor and the originating control module. Diagnostics ('Diagnostics') are executed on both the primary signal and the redundant signal (506, 506'). Diagnostics can include limit checks that indicate when the signal is outside of a predetermined operating range for the signal, a rationality check of the signal, and other diagnostics check that can indicate corruption of the signal. If a corrupted signal is detected ('Signal Fault') in either or both the primary signal and the redundant signal, a default signal is generated ('Defaulting') (508, 508') and communicated to a rationality check 510. The default signal preferably comprises a predetermined signal that is recognizable in the control module as indicating the primary signal or the redundant signal has been corrupted. When a fault is not detected ('No Fault'), the primary and/or the redundant signals are communicated to the rationality check 510. The rationality check 510 compares the primary signal and the redundant signal and identifies a fault ('Fault') when there is a difference detected between the primary and redundant signals. When the rationality check 510 indicates that the primary signal is valid ('Valid Signal'), the primary signal is communicated to a dual store function ('Dual Store') 511. The dual store function 511 monitors and compares present contents in first and second memory locations 512, 512' to verify integrity of the memory locations, preferably during each 6.25 ms loop cycle. When the dual store function 511 verifies integrity of the first and second memory locations, i.e., the present contents in the first and second memory locations are identical, the primary signal is stored as the primary signal in the first memory location ('Store Primary Signal') (512) and stored as a secondary signal in the second memory location ('Store Secondary Signal') (512'). The primary signal stored in the first memory location is subsequently communicated to a control path ('Primary Signal To Control Path'). The secondary signal stored in the second memory location is subsequently communicated to a security path. ('Secondary Signal To Security Path'). If there is a difference between the present contents of the memory locations, a fault ('Fault') is recorded indicating corruption of one of the first and second memory locations.

When the rationality check 510 indicates corruption of one or both of the primary and the redundant signals, or the dual store function 511 indicates corruption of the present contents of one the first and second memory locations 512, 512' the control system identifies occurrence of the fault ('Fault'). The control system determines whether the corrupted signal has matured ('Mature Fault') (514), and executes remedial action (516) to mitigate risks associated with the presence of the fault. A fault maturation algorithm can be executed, including, e.g., an X of Y routine wherein a fault has matured when X mismatched signals are observed out of immediately preceding Y signal observations. An example includes determining a fault has matured when more than half the immediately preceding observations indicate a corrupted signal.

Monitoring integrity of a signal transmitted over a serial bus includes detecting missing data, e.g., detecting loss of a message frame and taking a short term mitigation action and informing the receiving control module that no new data is available. Detecting missing data also includes detecting long term loss of communications to one of the control modules and taking a remedial action.

Figure 6:
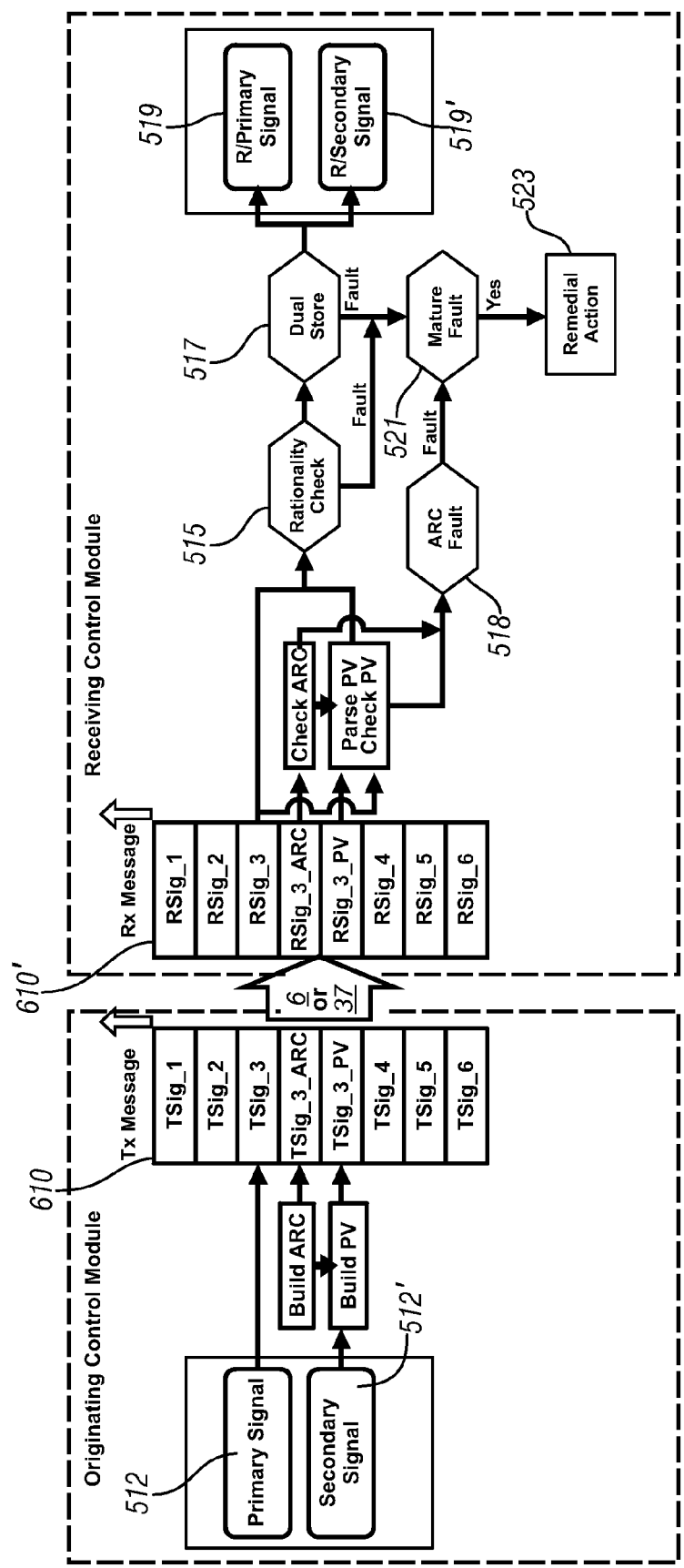

FIG. 6 shows communicating the redundantly stored signals, e.g., the dual stored signal from FIG. 5, from the originating control module to the receiving control module using a communications bus, e.g., LAN bus 6 or SPI bus 37. The originating control module generates a message ('Tx Message') 610 to transmit. In the embodiment shown, the transmitted message 610 includes words comprising other signals ('TSig_1' and 'TSig_2', 'TSig_4', 'TSig_5' and 'TSig_6'). The primary signal being secured is preferably inserted as a third word ('TSig_3'). The subsequent word ('TSig_3_ARC') comprises an alive rolling count ('Build ARC') consisting of a two bit digital word (one of 00, 01, 10, 11) wherein the two bit word sequentially increments from 00 to 01 to 10 to 11 and repetitively cycles back to begin at 00 for consecutively generated and transmitted messages. The control module generates a fifth word ('TSig_3_PV') which preferably includes adding the alive rolling count to the secondary signal and generating a protection value ('Build PV'). Generating the protection value preferably comprises generating a logic complement, e.g., a 2's complement, of the secondary signal with the added alive rolling count.

The message 610 is transmitted over one of the serial communications links (LAN bus 6 or SPI bus 37), and received at the receiving control module as a received message ('Rx Message') 610'. The received message 610' is decoded, including determining received words ('RSig_1', 'RSig_2', 'RSig_3', 'RSig_3_ARC', 'RSig_3_PV', 'RSig_4', 'RSig_5' and 'RSig_6'). The third word ('RSig_3') is captured and will be stored in a predetermined memory location as a received primary signal ('R/Primary Signal') subsequent to a successful rationality check 515 and a successful dual-store function 517 of memory locations 519 and 519'. The fourth word ('RSig_3_ARC') is captured and interpreted as a received alive rolling count. The received alive rolling count is compared to an expected alive rolling count, i.e., the next two bit word in the sequence from 00 to 01 to 10 to 11 ('ARC Fault') (518). A fault is recorded if the received alive rolling count is not equal to an expected alive rolling count (518). The fifth word ('RSig_3_PV') is captured and a received secondary signal ('R/Secondary Signal') is determined by generating a corresponding inverse logic complement of the fifth word and parsing out the alive rolling count ('Parse PV/Check PV'). Preferably the alive rolling count from the fourth word is subtracted therefrom.

The rationality check 515 compares the received primary signal and the received secondary signal and identifies a fault ('Fault') when a difference is detected, preferably prior to storing the received primary signal. When the rationality check 515 indicates that the signal is valid, the primary signal is communicated to the dual store function ('Dual Store') 517. The dual store function 517 monitors and compares present contents in first memory location 519 and second memory location 519' to verify integrity of the memory locations, preferably during each 6.25 ms loop cycle. When the dual store function 517 compares and determines the contents of the first and second memory locations 519 and 519' are identical, the received primary signal is dual-stored, i.e., the received primary signal ('R/Primary Signal') is stored in both the first and second memory locations 519 and 519'. If there is a difference between the present contents of the first and second memory locations 519 and 519', a fault ('Fault') is recorded indicating corruption of one of the first and second memory locations 519 and 519' and remedial action is undertaken consistent with the specific signal.

When a fault is recorded based upon the received alive rolling count not being equal to the expected alive rolling count (518), or the rationality check 515 indicates corruption of one or both of the primary and the redundant signals, or the dual store function 517 indicates corruption of the present contents of one the first and second memory locations, the control system identifies occurrence of the fault ('Fault'). The control system determines whether the corrupted signal has matured to a fault using a fault maturation algorithm ('Mature Fault') (521), and executes remedial action (523) to mitigate risks associated with the presence of the fault. The fault maturation algorithm can be executed to determine whether the corrupted signal has matured, including, e.g., an X of Y routine wherein a fault has matured when X mismatched signals are observed out of immediately preceding Y signal observations. An example includes determining a fault has matured when more than half the immediately preceding observations indicate a corrupted signal. As shown, there is a common fault maturation algorithm 521 for the alive rolling count comparison 518, the rationality check 515 and the dual store function 517. Alternatively, there can be individually executed fault maturation algorithms.

Messages are transmitted at a rate dependent upon the communications rate of the specific bus, e.g., the LAN bus 6 or SPI bus 37, which can be 1 Mbps. In one embodiment, messages are communicated across the LAN bus 6 every 6.25 ms loop cycle. Messages can be sent serially and evaluated. The aforementioned signal monitoring software can execute a detection algorithm in one of the loop cycles to detect signal inconsistency between the primary signal and the secondary signal. When an inconsistency is detected, it is recorded as a mismatch count in a fault maturation algorithm, e.g., an X of Y routine wherein a fault is detected when X mismatched signals are observed out of immediately preceding Y signal observations. The control system can execute remedial action to mitigate risks associated with the presence of a fault identified by the fault maturation algorithm. An X of Y routine in which Y=16 and in which messages are communicated across the LAN bus 6 every 6.25 ms loop cycle is able to detect and mature a fault within 100 milliseconds.

Detection of a fault in communications can include detecting temporary loss of data and missing data, detecting corrupted data, and no data. Detecting missing data includes detecting loss of a message frame and taking a short term mitigation action and informing the receiving control module that no new data is available. Detecting no data includes detecting a long term loss of communications to one of the control modules and taking a remedial action. When missing data is detected during communications, the control module can enter a fail-soft mode, wherein torque commands are initially held unchanged, i.e., at steady-state torque levels for a predetermined period of time and then ramped down toward zero torque command. The control modules continue to communicate, and when valid communications are reestablished, torque commands can be ramped up to achieve the operator torque request, with rate-change of the output torque controlled to effect the previously described maximum rate of change in output torque, e.g., 0.2 g. When loss of communications is permanent, powertrain operation can be transitioned to a degraded state that limits output torque to a predetermined maximum level, preferably permitting some level of operation for a remainder of the key cycle.

When a fault is detected in the dual store functions 511, 517, the remedial action and fault mitigation can include disabling the actuator controlled by the respective control module in which the fault occurred. The remedial action can be actuator-specific or system-wide, and places the powertrain in a torque-safe state. The remedial action further includes storing an OBD compliant code for subsequent retrieval. A diagnostic may preliminarily identify a fault pending, meaning data corruption or an inconsistency has been detected but the fault maturation algorithm has not reached its threshold. The hardware integrity can be further determined using diagnostics software that monitors the sensors and actuators of the control system.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method to monitor signal integrity in a distributed control module system operative to control a hybrid powertrain system, the method comprising:
 establishing a single communications link between an originating control module and a receiving control module;
 generating a signal in the originating control module;
 verifying integrity of the signal within the originating control module including capturing primary and redundant signals based upon the signal, executing diagnostics on each of the primary and redundant signals, and comparing the primary signal with the redundant signal to validate the primary signal;
 dual storing the primary signal as the primary signal and a secondary signal;
 generating a message including the primary and secondary signals;
 transmitting the message to the receiving control module using the single communications link;
 receiving the message at the receiving control module;
 decoding the primary and secondary signals from the message within the receiving control module; and
 comparing the primary and secondary signals to verify integrity of the primary signal within the receiving control module.

2. The method of claim 1, wherein the signal comprises one of an operator command signal, an input signal, and an actuator control signal.

3. The method of claim 1, wherein dual storing the primary signal as the primary signal and the secondary signal comprises verifying integrity of each of first and second memory locations and then storing the primary signal in the first memory location and storing the primary signal in the second memory location as the secondary signal.

4. The method of claim 3, further comprising dual storing the primary signal as the primary signal and the secondary signal in the first and second memory locations only when the primary signal is valid and the integrity of each of the first and second memory locations is verified.

5. The method of claim 1, wherein generating the message including the signal comprises:
 including a first word consisting of the primary signal;
 including a second word consisting of a sequentially incrementing digital word value; and including a third word consisting of a logic complement of a sum of the secondary signal and the second word.

6. The method of claim 1, wherein decoding the primary and secondary signals from the message comprises:
capturing a first word from the message comprising the primary signal;
capturing a second word from the message;
capturing a third word from the message and taking a logic complement of the third word and subtracting the second word therefrom to determine a resultant comprising the secondary signal; and
validating the first word based upon the resultant.

7. The method of claim 1, further comprising:
verifying integrity of each of first and second memory locations in the receiving control module; and
dual storing the first word in both the first and second memory locations in the receiving control module.

8. The method of claim 7, further comprising dual storing the first word in both the first and second memory locations in the receiving control module only when the first word is validated and the integrity of each of the first and second memory locations in the receiving control module is verified.

9. The method of claim 1, further comprising executing remedial action when the integrity of the signal is not verified within the originating control module.

10. The method of claim 1, further comprising executing remedial action when the integrity of the signal is not verified within the receiving control module.

11. Method to monitor integrity of a signal for controlling a torque actuator communicated between an originating control module and a receiving control module in a distributed control module system for a powertrain system including a plurality of torque actuators, the method comprising:
establishing a single communications link between the originating control module and the receiving control module;
generating a signal in the originating control module;
verifying integrity of the signal within the originating control module including capturing primary and redundant signals based upon the signal, executing diagnostics on each of the primary and redundant signals, and comparing the primary signal with the redundant signal to validate the primary signal;
dual storing the primary signal as the primary signal and a secondary signal;
generating a message including the primary and secondary signals;
transmitting the message to the receiving control module using the single communications link;
receiving the message at the receiving control module;
decoding the primary and secondary signals from the message within the receiving control module;
comparing the primary and secondary signals to verify integrity of the primary signal within the receiving control module; and
operating one of the torque actuators based upon the primary signal.

12. The method of claim 11, wherein the torque actuators include an engine, a transmission and a torque generating machine, the transmission operative to transfer power between the engine and the torque generating machine and an output member.

13. Method to monitor integrity of a signal communicated between an originating control module and a torque actuator control module in a distributed control module system for a powertrain system including a plurality of torque actuators, the method comprising:
generating a signal in the originating control module;
capturing the signal as a primary and a redundant signal;
executing diagnostics on each of the primary and redundant signals;
validating the primary signal based upon the redundant signal;
verifying integrity of each of first and second memory locations in the originating control module;
storing the primary signal in both the first and second memory locations when the primary signal is valid and the integrity of each of the first and second memory locations is verified;
establishing a single communications link to transmit the primary signal between the originating control module and the torque actuator control module;
generating a message including the primary signal stored in both the first and second memory locations; and
transmitting the message to the torque actuator control module.

14. The method of claim 13, further comprising receiving the message at the torque actuator control module;
decoding and validating the primary signal from the received message within the torque actuator control module;
verifying integrity of first and second memory locations in the torque actuator control module; and
storing the primary signal in the first and second memory locations in the torque actuator control module when the primary signal is validated and the integrity of the first and second memory locations in the receiving control module are verified.

15. The method of claim 13, further comprising;
receiving the message at the torque actuator control module;
decoding the primary signal from the received message within the torque actuator control module;
verifying integrity of the decoded primary signal within the torque actuator control module; and
operating one of the torque actuators based upon the verified primary signal.

16. The method of claim 13, wherein verifying integrity of each of the first and second memory locations in the originating control module comprises determining whether contents of the first and second memory locations are identical prior to storing the primary signal therein.

* * * * *